United States Patent [19]

Greenwood et al.

[11] Patent Number: 5,385,334
[45] Date of Patent: Jan. 31, 1995

[54] FLUID FLOW VALVE

[75] Inventors: Peter J. Greenwood, Danbury; Benedict J. Aliano, Oxford; Taeeon Lee; Martin M. Barolli, both of Waterbury, all of Conn.

[73] Assignee: Carten Controls Inc., Middlebury, Conn.

[21] Appl. No.: 92,709

[22] Filed: Jul. 16, 1993

[51] Int. Cl.6 ............................................. F16K 31/00
[52] U.S. Cl. ................................. 251/335.3; 251/332; 251/357
[58] Field of Search ........................ 251/332, 335.3, 357

[56] References Cited

U.S. PATENT DOCUMENTS

| 3,057,372 | 10/1962 | Sutton et al. | 251/332 |
| 3,191,617 | 6/1965 | Maddox | 251/357 |
| 3,202,178 | 8/1965 | Wolfe | 251/357 |
| 4,421,298 | 12/1983 | Kujawski | 251/335.3 |
| 4,909,271 | 3/1990 | Canaan et al. | 137/240 |
| 4,911,411 | 3/1990 | Jones et al. | 251/335.3 |
| 4,991,619 | 2/1991 | della Porta | 137/240 |

FOREIGN PATENT DOCUMENTS 0377418 7/1990 European Pat. Off. ......... 251/335.3

Primary Examiner—A. Michael Chambers
Attorney, Agent, or Firm—John H. Crozier

[57] ABSTRACT

In a preferred embodiment, in a fluid flow valve having a body and having a movable member with lower face, the movable member being movable between a position spaced from a sealing position in the body when the valve is in an open position and movable to the sealing position when the valve is in a closed position, the improvement including: an annular sealing member disposed in the outer periphery of the lower face of the movable member to sealingly engage a portion of the body when the valve is in the closed position.

15 Claims, 3 Drawing Sheets

FLUID FLOW VALVE

BACKGROUND OF THE INVENTION

1. Field of the Invention

The present invention relates to valves generally and, more particularly, but not by way of limitation, to a novel fluid flow valve which is particularly useful in applications in which maintaining the purity of the fluid passing through the valve is critical.

2. Background Art

Fluid flow valves are widely used in a variety of applications for controlling the flow of fluids. In some applications, it is critical that the purity of the fluid passing through the valve be maintained. An example of such a application is in the handling of gas in the manufacture of semiconductors.

Known conventional valves for such applications as the latter mentioned above suffer from the disadvantage that the configuration thereof permits impurities to enter the gases passing through them. For example, such conventional valves typically employ, as a sealing member, a relatively large disk or plug constructed of a synthetic material, such as Kel-F. This relatively large volume of synthetic material absorbs moisture which can enter the gas as an impurity. Other impurities, such as other gases, may be similarly absorbed. Furthermore, the sealing disks or plugs of such valves are attached by means of bolts having heads which project into the flow path, disrupting the flow and/or leading to contaminant particle generation. Also, such valves frequently have other such projections or sharp edges which also lend themselves to contaminant particle generation.

A further disadvantage of some known conventional valves is that, when they are moved to a closed position, there is wiping action between sealing members, which wiping action is provided to wipe debris from the faces of the sealing members. This feature, of course, will loosen contaminant particulate matter into the fluid passing through the valves.

Yet another disadvantage of some known conventional valves is that their construction causes them to be larger than would be required with an improved construction.

Accordingly, it is a principal object of the present invention to provide a fluid flow valve in which the volume of the sealing member is minimized.

It is a further object of the invention to provide a fluid flow valve in which there are no projections or sharp edges that can lead to contaminant particle generation.

It is an additional object of the invention to provide a fluid flow valve which does not provide wiping action between sealing members when the valve is being closed.

It is another object of the invention to provide a fluid flow valve which is of such improved construction that it is smaller than conventional valves.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, in a fluid flow valve having a body and having a movable member with lower face, said movable member being movable between a position spaced from a sealing position in said body when said valve is in an open position and movable to said sealing position when said valve is in a closed position, the improvement comprising: an annular sealing member disposed in the outer periphery of said lower face of said movable member to sealingly engage a portion of said body when said valve is in said closed position.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
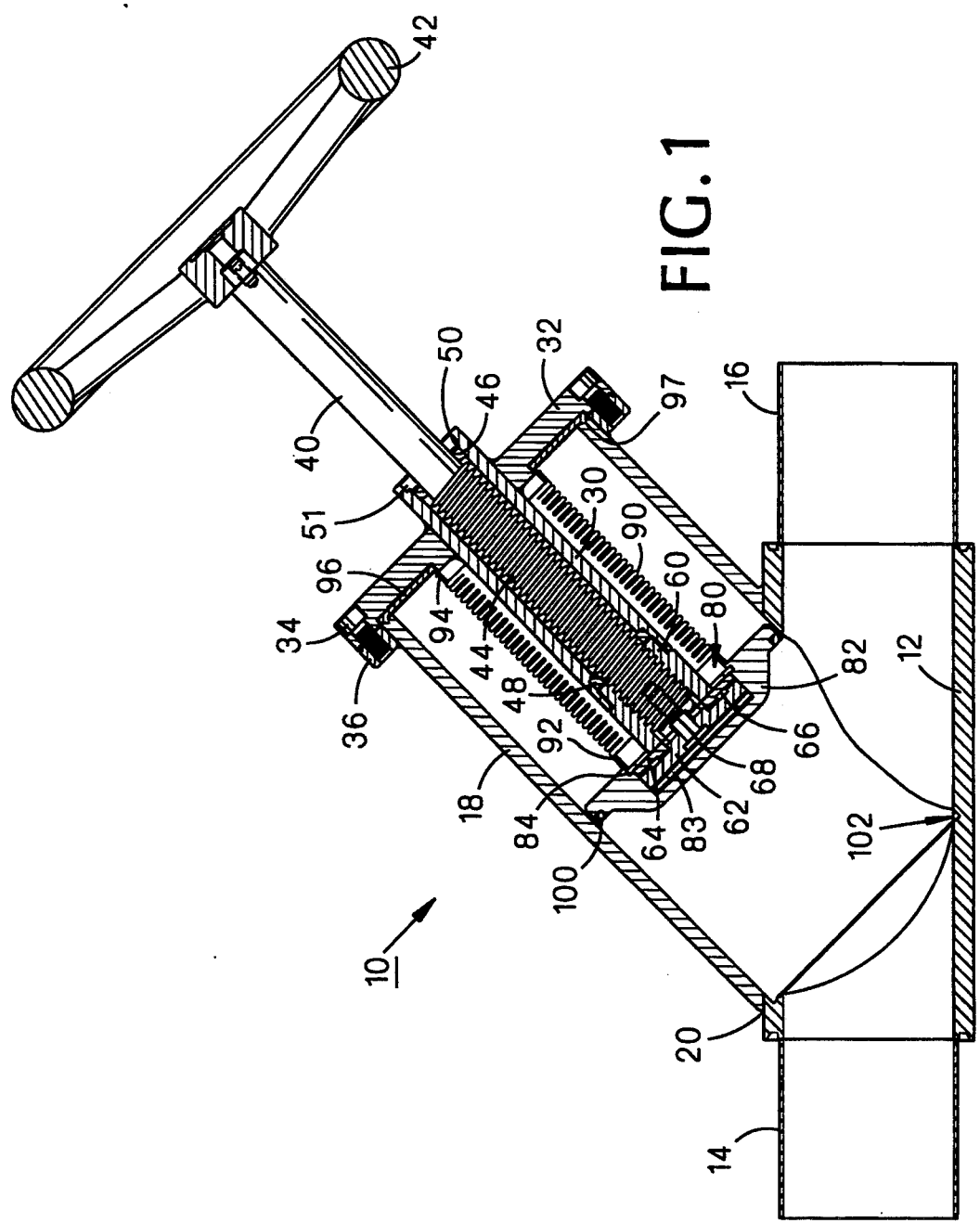
FIG. 1 is a side elevational view, partially in cross-section, of a fluid flow valve constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 2:
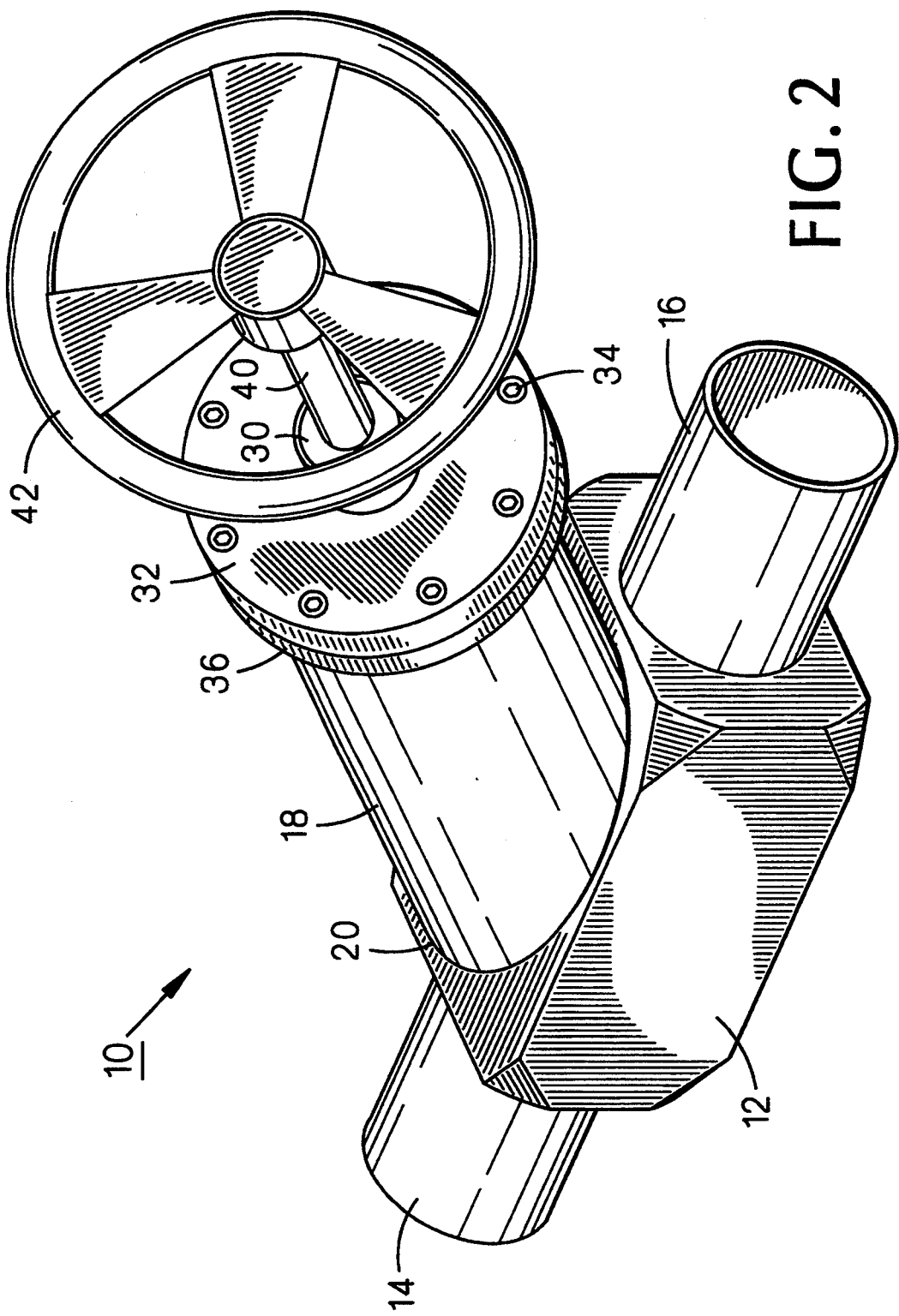
FIG. 2 is a perspective view of the valve of FIG. 1.

Referring first to FIGS. 1 and 2, there is illustrated a fluid flow valve, generally indicated by the reference numeral 10, constructed according to the present invention. Valve 10 includes a body 12 in the form of generally hollow rectangular solid, to which inlet and outlet tubes 14 and 16, respectively, are welded. A generally hollow, outer cylindrical shell 18 is obliquely attached at the proximal end thereof to the top of body 12 at an opening defined therein by means of an elliptical weld 20 (FIG. 2).

A generally hollow, cylindrical bonnet 30 is centrally axially disposed in outer shell 18 and is fixedly secured by welding to a circular bonnet flange 32 which is removably fixedly attached to the distal end of outer shell 18 by means of a plurality of screws, as at 34, which are threaded into an annular flange 36 fixedly disposed around the outer periphery of the distal end of the outer shell.

Reference now should be made to FIG. 1 alone for an understanding of the internal elements of valve 10.

An acme stem 40 having a handwheel 42 fixedly attached to its distal end and a thread defined 44 along its proximal end is centrally axially disposed in bonnet 30. Stem 40 is secured in bonnet 30 against radial movement with respect thereto by means of an annular upper guide bearing 46 disposed in the inner periphery of the distal end of the bonnet and an annular lower guide bearing 48 disposed in the inner periphery of the proximal end of the bonnet. Upper guide bearing 46 is secured in place by means of a retaining ring 50. An annular weather seal 51 sealingly engages acme stem 40 and the distal end of bonnet 30. Disposed in a groove defined around the inner periphery of the proximal end of bonnet 30 and extending from the distal end of the bonnet is an annular acme nut 60 into which thread 44 of acme stem 40 is threaded. Acme nut 60 is fixedly attached to the distal end of bonnet 30 by means of a thread and tack welding.

The use of an acme thread, which has a flat surface on the outer periphery of the threads thereof, permits lower guide bearing 48 to bear directly against the thread. This permits shortening of the length of stem 40 over conventional valves, in that the latter typically place two radial support bearings on the unthreaded portion of the stem. The latter arrangement requires that the stem be unnecessarily long.

Disposed adjacent the proximal end of acme stem 40 is a disk shaped pusher plate 62, lying in a plane orthogonal to the major axis of bonnet 30. Disposed between between pusher plate 62 and the proximal end of acme stem 40 and in contact with the latter is an annular thrust washer 64, lying in a plane parallel to the plane of pusher plate 62. Disposed between thrust washer 64 and pusher plate 62 is an annular wave washer 66. A bolt 68 having its head countersunk into the lower surface of pusher plate 62 is threaded into the proximal end of acme stem 40 and tack welded thereto, thus axially securing the pusher plate and thrust washer 64, and acme nut 60 to the proximal end of the acme stem. Pusher plate 62 and the proximal end of acme stem 40 are also keyed together by means of a square, unthreaded hub formed below the head of bolt 68.

Pusher plate 62 and thrust washer 64 are disposed in a generally cylindrical, central hollow portion 80 of a seat holder 82, with a disk shaped thrust bearing 83 disposed between the lower surface of pusher plate 62 and the bottom of the central hollow portion. Thrust washer 64, and therefore, wave washer 66 are secured in central hollow portion 80 by means of an annular retaining ring 84 disposed in a groove defined around the upper periphery of the central hollow portion, with the lower surface of the retaining ring bearing against the upper surface of the thrust washer.

Disposed about and encasing bonnet 30 is a cylindrical hollow bellows 90. The proximal end of bellows 90 is fixedly attached to the outer periphery of a rim 92 formed as an extension of the upper surface of seat holder 82 around the periphery of central hollow portion 80 of the seat holder. The distal end of bellows 90 is fixedly attached to a rim 94 formed as an extension of the lower surface of the central opening of an annular bellows flange 96. Bellows flange 96 is fixedly captured between bonnet flange 32 and the distal edge of outer shell 18, with a nickel foil seal disposed on the lower face of the bellows flange. An annular, semiresilient seat insert 100 is fixedly disposed in the outer periphery of a lower surface of seat holder 82, the attachment means of which will be described below.

Valve 10 is shown on FIG. 1 in its open position. Valve 10 is put in its closed position by means of the clockwise rotation of handwheel 42 which causes the clockwise rotation of acme stem 40. That causes seat holder 82 and the other elements attached thereto to advance into body 12 until seat insert 100 is in sealing engagement with the edge of a circular groove 102 defined in the body. During this advancement, seat holder 82 with seat insert therein is held against rotation by bellows 90 and is isolated from the rotational motion of pusher plate 62 by thrust washer 83, assuring that the seat insert engages the edge of circular groove 102 without wiping motion. It is to be noted that, desirably, there are no elements of valve 10 in the flow path of fluid passing through the valve when the valve is in its open position. Also, it is to noted that all elements of valve 10 which contact the fluid are smooth, with no projections or sharp edges thereon, thus minimizing the opportunity for the formation of particulate contaminants.

Figure 3:
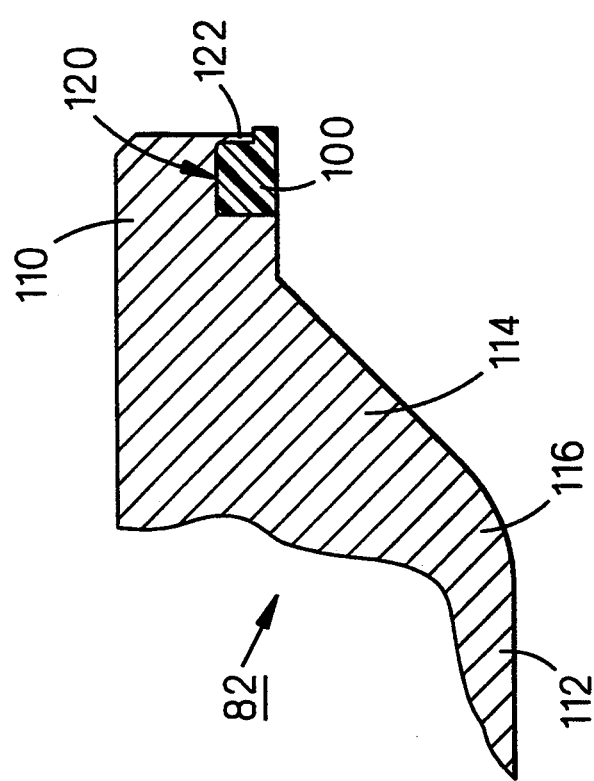
FIG. 3 is a fragmentary, enlarged detail of a portion of FIG. 1.

Reference now should be made to FIG. 3 for an understanding of the configuration of seat holder 82 and the means of attachment of seat insert 100 to the seat holder. Seat holder 82 includes a annular flange section 110 formed around the upper portion of the outer periphery of the seat holder and a flat, lower, central section 112. Flange section 110 and central section 112 are joined by a sloped intermediate section 114. It can be seen that an outwardly bulging intersection 116 between central and intermediate sections 112 and 114 is quite rounded, thus avoiding any sharp projection that could result from a different configuration.

Seat insert 100 has a generally rectangular cross-section and fits tightly into a corresponding step 120 defined in the lower outer edge of flange section 110 of seat holder 82, with the lower surface of the seat insert flush with the lower surface of the flange section. An integral rim 122 depends from the lower edge of the outer periphery of flange section 110 and lies adjacent the cylindrical outer surface of seat insert 100. After seat insert 100 is so mounted on seat holder 82, an annular tool (not shown) having a sloped inner surface is forced over the lower outer edge of seat insert 100, bending the distal end of rim 122 inward and locking the seat insert in place.

Rim 122 does not completely cover the outside of seat insert 100, but a monolithic annular flange 124 formed around the lower outer edge of the seat insert extends outwardly beyond the rim. This arrangement has two functions. First, flange 124 prevents scraping of seat holder 82 against the inner surface of outer shell 18 when valve 10 is assembled. Second, when valve 10 is in use, flange 124 absorbs shock waves and prevents metal-to-metal contact.

It can be seen that seat insert 100 has a small surface area, only large enough to effect sealing with the rim of groove 102 in body 12 and comprises a relatively small volume of material into which only a relatively small volume of moisture impurity or other impurities may be absorbed, in contrast to conventional valves. The width of seat insert 100 is only about four to five percent of the diameter of seat holder 82.

It is important to note that, when valve 10 is moved to its closed position, the flat lower surface of seat insert 100 will engage the rim of groove 102 without any wiping action.

As is noted above, the arrangement of having lower guide bearing 48 disposed against the thread portion 44 of acme stem 40 permits shortening of one dimension of valve 10. A further shortening is achieved by having seat insert 100 disposed above lower portion 112 of seat holder 82.

The components of valve 10 may be fabricated of any materials suitable for the fluid(s) to be handled and seat insert 100 will, in most cases, preferably be fabricated from Kel-F.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. In a fluid flow valve having a body and having a movable member with a lower face, said movable member being movable between a position spaced from a sealing position in said body when said valve is in an open position and movable to said sealing position when said valve is in a closed position, the improvement comprising:
   (a) an annular sealing member disposed in the outer periphery of said lower face of said movable member to sealingly engage a portion of said body when said valve is in said closed position;
   (b) wherein said sealing member is disposed in a flange section of said movable member formed around said movable member;
   (c) wherein said lower face of said movable member includes a flat central section and an intermediate section intersecting and joining said flat section with said flange section; and
   (d) wherein the intersection of said central and intermediate sections is smooth and rounded.

2. In a fluid flow valve having a body and having a movable member with a lower face, said movable member being movable between a position spaced from a sealing position in said body when said valve is in an open position and movable to said sealing position when said valve is in a closed position, the improvement comprising:
   (a) an annular sealing member disposed in the outer periphery of said lower face of said movable member to sealingly engage a portion of said body when said valve is in said closed position;
   (b) a stem having a smooth portion at the distal end thereof and a threaded portion at the proximal end thereof;
   (c) said sealing means is operatively attached to said proximal end of said stem and rotation of said stem causes said valve to move between said open position and said sealing position;
   (d) an upper guide bearing disposed against said smooth portion of said stem to support said stem against radial movement thereof; and
   (e) a lower guide bearing disposed against said threaded portion of said stem to support said stem against radial movement thereof.

3. An improved fluid flow valve, as defined in any of claims 1 or 2, wherein said sealing member is disposed in a step defined in a lower edge of an outer periphery of said movable member.

4. An improved fluid flow valve, as defined in any of claims 1 or 2 wherein:
   (a) said movable member has a step defined around a lower edge of the outer periphery thereof corresponding substantially to the cross-sectional shape of said sealing member; and
   (b) said movable member includes a rim depending from said outer periphery of said movable member circumjacent at least a portion of the outer periphery of said sealing member.

5. An improved fluid flow valve, as defined in claim 4, wherein said sealing member has an integral annular flange extending beyond the outer periphery of said movable member.

6. An improved fluid flow valve, as defined in claim 4, wherein the distal end of said rim of said movable member is bent toward the center of said movable member to lock said sealing member in place.

7. An improved fluid flow valve, as defined in any of claims 1 or 2 wherein said movable member has smooth surface(s) and has no sharp edges or projection which contact a fluid passing through said valve.

8. An improved fluid flow valve, as defined in claim 7, wherein:
   (a) said sealing member has a lower surface and is disposed in said movable member such that said lower surface of said sealing member is flush with said lower face of said movable member; and
   (b) said movable member has smooth surface(s) and has no sharp edges or projections which can contact a fluid passing through said valve.

9. An improved fluid flow valve, as defined in any of claims 1 or 2 wherein said sealing member sealing engages said portion of said body, without wiping action between said sealing member and said portion of said body, while said movable member is being moved to said sealing position.

10. An improved fluid flow valve, as defined in any of claims 1 or 2 wherein said portion of said body is a rim of a groove defined in said body and a flat face of said sealing member engages said rim, without wiping action between said flat face and said rim, when said movable member is being moved to said sealing position.

11. An improved fluid flow valve, as defined in any of claim 1 or 2 wherein the width of said sealing member is on the order of about four to five percent of the width of said movable member.

12. An improved fluid flow valve, as defined in any of claims 1 or 2 wherein said valve comprises a generally hollow body portion of a rectilinear solid shape with inlet and outlet openings defined at opposite faces thereof on the major axis of said body, said body having attached thereto a generally hollow cylindrical shell portion, the major axis of said shell portion being disposed at an oblique angle to said major axis of said body portion, said body portion and said cylindrical shell portion being obliquely cojoined at an common elliptical opening.

13. An improved fluid flow valve, as defined in any of claims 1 or 2 wherein said sealing member includes a monolithic portion thereof extending beyond the outer periphery of said movable member.

14. An improved fluid flow valve, as defined in any of claims 1 or 2 wherein the thickness of said sealing member is on the order of about three to four percent of the width of said movable member.

15. An improved fluid flow valve, as defined in claim 1, wherein said sealing member is axially spaced apart from said lower face of said movable member.

* * * * *